United States Patent
Koenig et al.

(10) Patent No.: US 9,821,962 B2
(45) Date of Patent: Nov. 21, 2017

(54) CANTILEVERED SCREW ASSEMBLY

(71) Applicants: Mark E. Koenig, Pickerington, OH (US); Larry E. Koenig, Canal Winchester, OH (US)

(72) Inventors: Mark E. Koenig, Pickerington, OH (US); Larry E. Koenig, Canal Winchester, OH (US)

( * ) Notice: Subject to any disclaimer, the term of this patent is extended or adjusted under 35 U.S.C. 154(b) by 0 days.

(21) Appl. No.: 14/968,658

(22) Filed: Dec. 14, 2015

(65) Prior Publication Data

US 2017/0166404 A1    Jun. 15, 2017

(51) Int. Cl.
*B65G 33/32* (2006.01)

(52) U.S. Cl.
CPC .................. *B65G 33/32* (2013.01)

(58) Field of Classification Search
CPC ....... B65G 33/26; B65G 33/32; B65G 33/265
USPC ...................... 198/550.6, 658, 671, 672, 677
See application file for complete search history.

(56) References Cited

U.S. PATENT DOCUMENTS

| | | |
|---|---|---|
| 728,516 A | 5/1903 | Trabue |
| 829,315 A | 8/1906 | Anderson |
| 1,221,054 A | 4/1917 | Hyatt |
| 1,506,036 A | 8/1924 | Willmarth |
| 2,470,278 A | 5/1949 | West et al. |
| 2,576,784 A | 11/1951 | Dodds et al. |
| 2,615,387 A | 10/1952 | Messing |
| 2,823,603 A | 2/1958 | Collins |
| 2,902,922 A | 9/1959 | Williams |
| 2,982,201 A | 5/1961 | Kruger et al. |
| 3,179,040 A | 4/1965 | Seltzer |
| 3,588,356 A | 6/1971 | Moshier et al. |
| 3,787,830 A | 1/1974 | Cato et al. |
| 3,866,529 A | 2/1975 | Holman |
| 3,877,365 A | 4/1975 | Berggren |
| 3,938,434 A | 2/1976 | Cox |
| 3,982,483 A | 9/1976 | Bird et al. |
| 4,037,528 A | 7/1977 | White et al. |
| 4,289,067 A | 9/1981 | Hanak |
| 4,323,007 A | 4/1982 | Hunt et al. |
| 4,355,905 A | 10/1982 | St. Louis et al. |
| 4,516,492 A | 5/1985 | Olfert |
| 4,567,820 A | 2/1986 | Munsell |
| 4,636,127 A | 1/1987 | Olano et al. |
| 4,709,628 A | 12/1987 | Glowacki |
| 4,770,236 A | 9/1988 | Kulikowski |
| 4,784,563 A | 11/1988 | Esh et al. |
| 4,807,816 A | 2/1989 | Ataka |
| 4,852,817 A | 8/1989 | Tipton |
| 4,897,194 A | 1/1990 | Olson |
| 4,951,884 A | 8/1990 | Koenig |
| 5,040,736 A | 8/1991 | Obitz |
| 5,108,040 A | 4/1992 | Koenig |

(Continued)

OTHER PUBLICATIONS

FKC Co., Ltd., Biosolids Dewatering, sales literature, 2 pages, found at www.fkcscrewpress.com, copyrighted 2009.

(Continued)

*Primary Examiner* — Leslie A Nicholson, III
*Assistant Examiner* — Lester Rushin
(74) *Attorney, Agent, or Firm* — Standley Law Group LLP (57) ABSTRACT

A cantilevered screw assembly comprising an improved support wall assembly. In an exemplary embodiment, a support wall may be formed of a single casting with at least a portion of a bearing housing.

17 Claims, 8 Drawing Sheets

(56) References Cited

U.S. PATENT DOCUMENTS

| | | | |
|---|---|---|---|
| 5,114,331 A | 5/1992 | Umehara et al. | |
| 5,148,994 A | 9/1992 | Haider et al. | |
| 5,148,998 A | 9/1992 | Obitz | |
| 5,180,225 A | 1/1993 | Piccolo, Sr. et al. | |
| 5,246,180 A * | 9/1993 | Berry, III | B65H 49/32 242/129.51 |
| 5,308,003 A | 5/1994 | Koenig | |
| 5,373,923 A | 12/1994 | Koenig | |
| 5,383,397 A | 1/1995 | Battles et al. | |
| 5,452,692 A * | 9/1995 | Spray | F01M 11/00 123/195 C |
| 5,601,239 A | 2/1997 | Smith et al. | |
| 5,611,268 A | 3/1997 | Hamilton | |
| 5,662,035 A | 9/1997 | Lee | |
| 5,681,132 A * | 10/1997 | Sheppard, Jr. | B65G 53/48 406/146 |
| 5,695,136 A | 12/1997 | Rohden et al. | |
| 5,735,199 A | 4/1998 | Esau et al. | |
| 5,819,643 A | 10/1998 | McIlwain et al. | |
| RE36,023 E | 1/1999 | Koenig | |
| 5,998,640 A | 12/1999 | Haefele et al. | |
| 6,186,060 B1 | 2/2001 | Peterson | |
| 6,247,662 B1 | 6/2001 | Hamilton | |
| 6,276,622 B1 | 8/2001 | Obitz | |
| 6,505,550 B2 | 1/2003 | Hamilton | |
| 6,793,165 B2 | 9/2004 | Obitz | |
| 6,945,487 B1 | 9/2005 | Obitz | |
| 6,948,329 B2 | 9/2005 | Nomura et al. | |
| 7,226,213 B2 | 6/2007 | Roos et al. | |
| 7,229,526 B2 | 6/2007 | Obitz | |
| 7,234,915 B2 | 6/2007 | Obitz | |
| 7,360,639 B2 | 4/2008 | Sprouse et al. | |
| 7,523,996 B1 | 4/2009 | Darst | |
| 7,631,596 B2 | 12/2009 | Williams et al. | |
| 7,740,325 B1 | 6/2010 | Chen | |
| 7,828,482 B2 | 11/2010 | Beausoleil et al. | |
| 7,851,585 B2 | 12/2010 | Brison et al. | |
| 8,033,733 B2 | 10/2011 | Lang | |
| 9,089,143 B2 | 7/2015 | Estes | |
| 9,152,087 B2 | 10/2015 | Yoshii et al. | |
| 2005/0054507 A1 | 3/2005 | Cornay et al. | |
| 2005/0069446 A1 | 3/2005 | Kriehn | |
| 2008/0121497 A1 | 5/2008 | Esterson et al. | |
| 2010/0266230 A1 | 10/2010 | Hong | |
| 2011/0011283 A1 | 1/2011 | Burke | |

OTHER PUBLICATIONS

Runi Danish Engineering, SK240, sales literature, 1 page, found at www.runi.dk, copyrighted 2009.

Runi Danish Engineering, Screw compactor, product information, 2 pages, found at www.compactor-runi.com, Apr. 19, 2011.

PolyMax, Polystyrene Foam Densifier, product information, 1 page, found at www.polyman5000.com, copyrighted 2006.

Intcorecycling.com, GreenMax Recycling Machine, product information, 1 page, found at www.intcorecycling.com, copyrighted 2009-2010.

Foam Equipment + Consulting Co., Heger Recycling Equipment, sales literature, 3 pages, found at www.foamequipment.com/heger.com, copyrighted 2009.

RecycleTech Corp., RecycleTech—The Environment Savers, company information, 1 page, found at www.recycletechno.com, copyrighted 2009.

Intcorecycling.com, GreenMax Recycling Machine, product information, 2 pages, found at www.intcorecycling.com, copyrighted 2009-2010.

Sebright Products, Inc., Bright Technologies—Innovators in Dewatering Equipment Technologies, product information, 2 pages, found at www.brightbeltpress.com, copyrighted 2006.

* cited by examiner

CANTILEVERED SCREW ASSEMBLY

BACKGROUND AND SUMMARY OF THE INVENTION

Exemplary embodiments of the present invention relate generally to a cantilevered screw assembly. Examples of cantilevered screw assemblies may include, but are not limited to, augers, compactors, crushers, shredders, feeders, material handlers, bale breakers, briquetters, and autoclave sterilizers. Other applications of cantilevered screw assemblies are also possible.

There is a need to improve known cantilevered screw assemblies. Large scale cantilevered screw assemblies are in particular need of improvement due to the dynamics of such systems. Nevertheless, small scale cantilevered screw assemblies may have a similar need for improvement.

For example, needs exist to improve the stability, size, and load-bearing capacity of cantilevered screw assemblies. The screws of some known cantilevered screw assemblies have a tendency to shift in position or wobble during operation. The anchoring of known cantilevered screw assemblies may also limit load-bearing capacity. For instance, known assemblies may cantilever a screw to a load-bearing wall. The load-bearing wall may limit the size of the screw and the amount of material that can be processed. If the size of the screw is excessive, it may compromise the load-bearing wall. For example, it may lead to oil canning of the load-bearing wall. Oil canning may affect the operation of the screw as aforementioned, and it may eventually render the system inoperable.

Needs also exist to reduce the weight and manufacturing complexity of cantilevered screw assemblies. Some known cantilevered screw assemblies simply increase the girth of a load-bearing wall or include a series of bracing members in an attempt to increase the assemblies' load-bearing capacity. The assemblies of some known cantilevered screw assemblies also require many separate parts to be welded or otherwise assembled together to create the cantilevered screw assembly. This requires additional design and manufacturing complexity, including time, material, equipment, and labor resources to manufacture the assembly. Further, the additional fasteners, weld material, and other assembly devices add more weight to the assembly.

Exemplary embodiments may satisfy one or more of the aforementioned needs. An exemplary embodiment of a cantilevered screw assembly includes an improved support wall assembly comprising at least one load-bearing wall. In particular, an exemplary embodiment may comprise a screw that is cantilevered to the at least one load-bearing wall.

More specifically, in an exemplary embodiment, the cantilevered screw assembly includes a wall and at least a portion of a bearing housing that are formed as a one-piece unit. For example, the wall may be cast with at least a portion of the bearing housing in an exemplary embodiment. In one example, the bearing housing may comprise a body, a flared edge, a plurality of flanges, and/or a number of receptacles that are formed of a one-piece unit (e.g. a single casting) with the support wall, thereby eliminating the need to manufacture and assemble these parts separately. In an exemplary embodiment, the single casting may reduce manufacturing and assembly costs when compared to assemblies requiring that these parts be manufactured separately and assembled. This may additionally reduce excess material such as weld material, fasteners, other assembly devices, or other excess material otherwise required to manufacture the assembly, which may reduce the weight of the assembly. Further, this may eliminate or lessen the need for increased girth of the walls or additional bracing members. This may also allow for increased strength and rigidity of a comparable or lesser weight assembly.

Examples of the improved support wall assembly may allow for a larger screw without compromising stability or the integrity of the load-bearing wall. Also, exemplary embodiments may enable more material to be processed by the cantilevered screw assembly with greater power and torque. Exemplary embodiments may further allow for reduced construction costs and assembly size when compared to assemblies requiring additional walls or other large assemblies for cantilevering the screw assembly.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to a cantilevered screw assembly. FIGS. 1-4 show various views of an exemplary embodiment of a cantilevered screw assembly 110 comprising a screw 112, which has a shaft 114. While this embodiment of shaft 114 has a slight taper, other types of cantilevered screw assemblies may also benefit from aspects of the present invention. For instance, some embodiments may not have a shaft with a taper, while other embodiments may have a shaft with a reverse taper. For embodiments that have a shaft with a taper or reverse taper, the degree of the taper or reverse taper may be selected to fit the application of the cantilevered screw assembly.

In the present exemplary embodiment, screw 112 is cantilevered to a wall of a multiple wall assembly 130. In this exemplary embodiment, the multiple wall assembly 130 is comprised of a first wall 132 to which bearings are mounted and the screw 112 is cantilevered. This exemplary embodiment of multiple wall assembly 130 may also include an anchor wall 136 associated with shaft 114. However, other exemplary embodiments may not include an anchor wall (i.e., the screw is cantilevered to a single support wall), or other exemplary embodiments may include additional walls in a multiple wall assembly (which may or may not be incorporated in the one-piece support wall assembly).

In this exemplary embodiment, shaft 114 of screw 112 is rotatably mounted by the use of at least one bearing (e.g., a first bearing 120 and a second bearing 122) that is housed in a bearing assembly comprising a bearing housing 160. Other exemplary embodiments may include more bearings. In this example, the bearing housing 160 may extend through a first wall 132. The bearing housing 160 may comprise a body 161 that houses the bearings. The bearing housing 160 may further comprise at least one flared edge 162 in association with at least one flange 164, wherein at least one flared edge 162 and at least one flange 164 extend from body 161. In one exemplary embodiment, the bearing housing may be secured or reinforced in part by the use of a series of receptacles 166 adapted to house a series of reinforcement members that may extend from first wall 132 to anchor wall 136. Additionally, in an exemplary embodiment, a drive chain assembly 170, a first sprocket 172, and a second sprocket 174 may power the rotation of the cantilevered screw assembly 110.

In this exemplary embodiment of the multiple wall assembly 130, the first wall 132 is connected to anchoring wall 136. The first wall 132 may be framed by a channel 102, which may extend from first wall 132 to anchoring wall 136.

In this example, first wall 132 and at least a portion of bearing housing 160 may be integrally formed as a one-piece unit. More particularly, in a preferred exemplary embodiment, first wall 132 and at least a portion of bearing housing 160 (e.g., at least a portion of body 161, flared edge 162, and/or flange 164) and/or channel 102 may be formed of a single casting. As mentioned above, the bearing assembly in some exemplary embodiments may also be fixed to the first wall 132 (in part) by at least one reinforcement member and/or at least one reinforcement member may reinforce first wall 132 and/or bearing housing 160. Alone or in combination with a multiple wall assembly, the use of an exemplary embodiment of a one-piece support wall assembly (e.g., a single casting) with or without at least one reinforcement member may provide improved structural support for the cantilevered assembly as compared to known cantilevered assemblies. An exemplary embodiment may improve the stability of the screw and wall(s) and also allow for a larger and more powerful screw that is adapted to process more material. In particular, a single casting of an exemplary embodiment advantageously strengthens the assembly and facilitates improved distribution of the forces associated with cantilevering the screw assembly, which may permit the assembly in one exemplary embodiment to be cantilevered without the need for bulky reinforcement members or otherwise larger components to handle the associated forces. In addition, a one-piece support wall assembly (e.g., a cast wall assembly) may decrease material and assembly costs and increase manufacturing efficiency.

Figure 1:
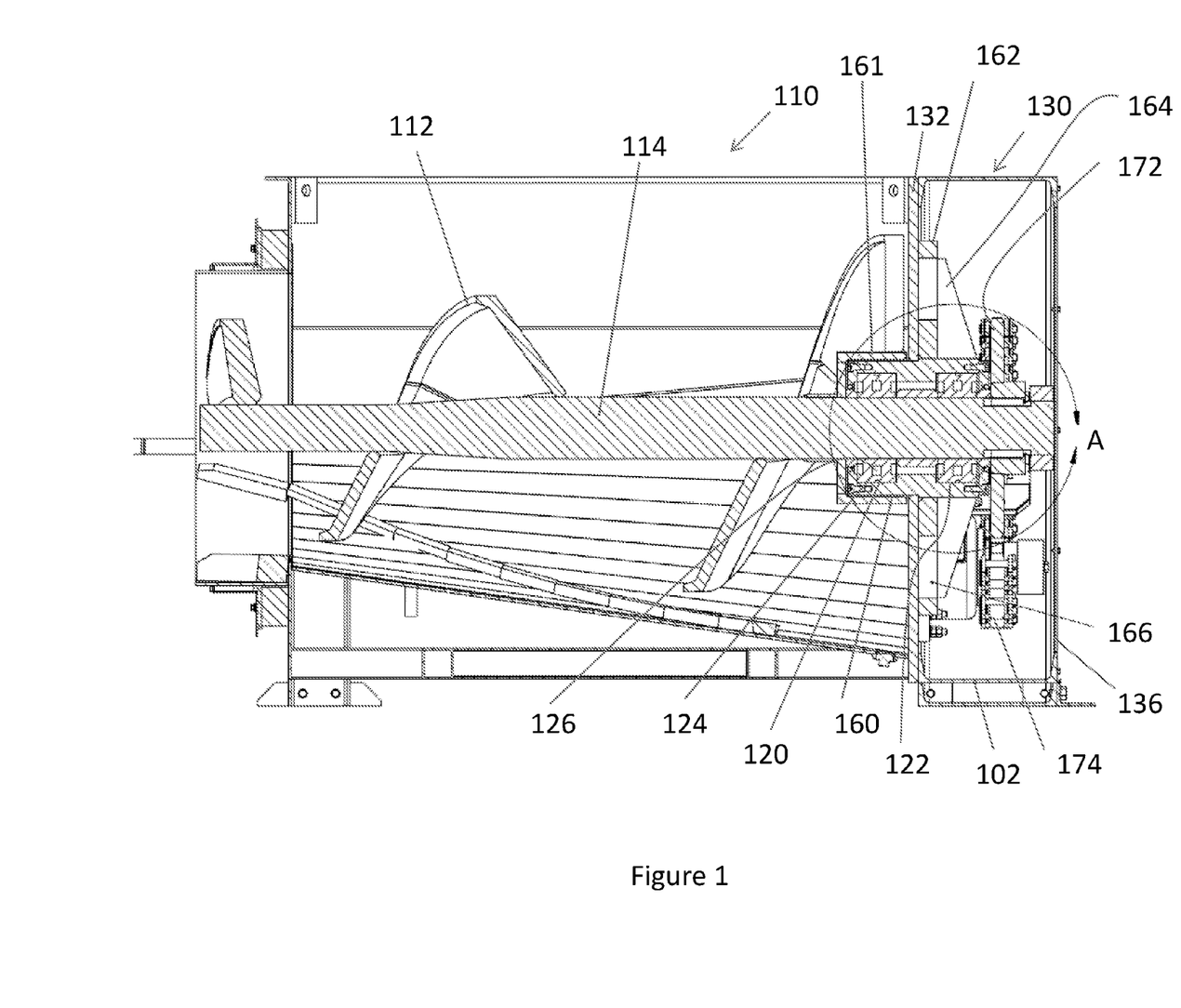
FIG. 1 is a cross-section view of an exemplary embodiment of a cantilevered screw assembly, additionally indicating Detail A.
Figure 2:
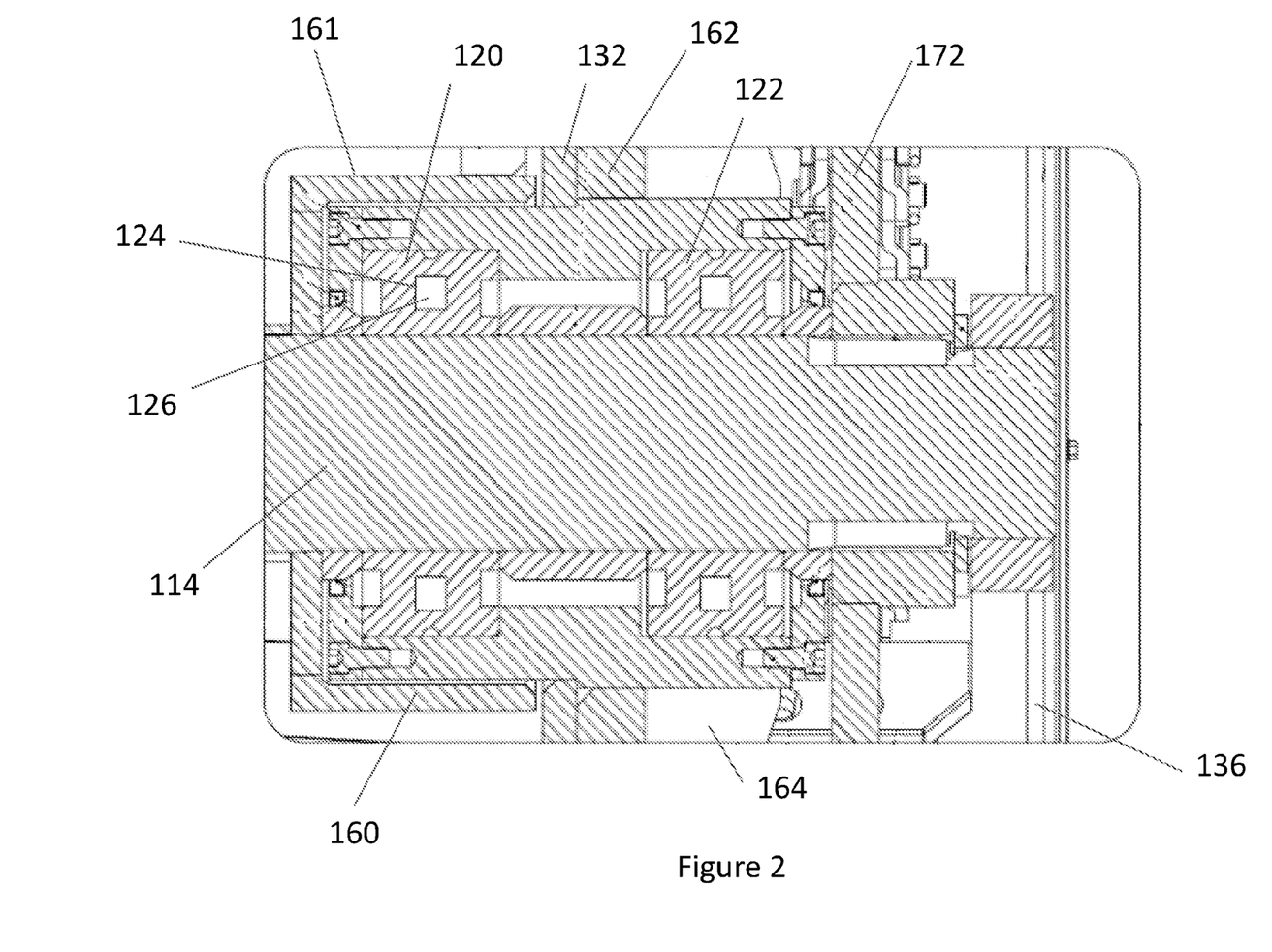
FIG. 2 is a view of Detail A of FIG. 1.
Figure 3:
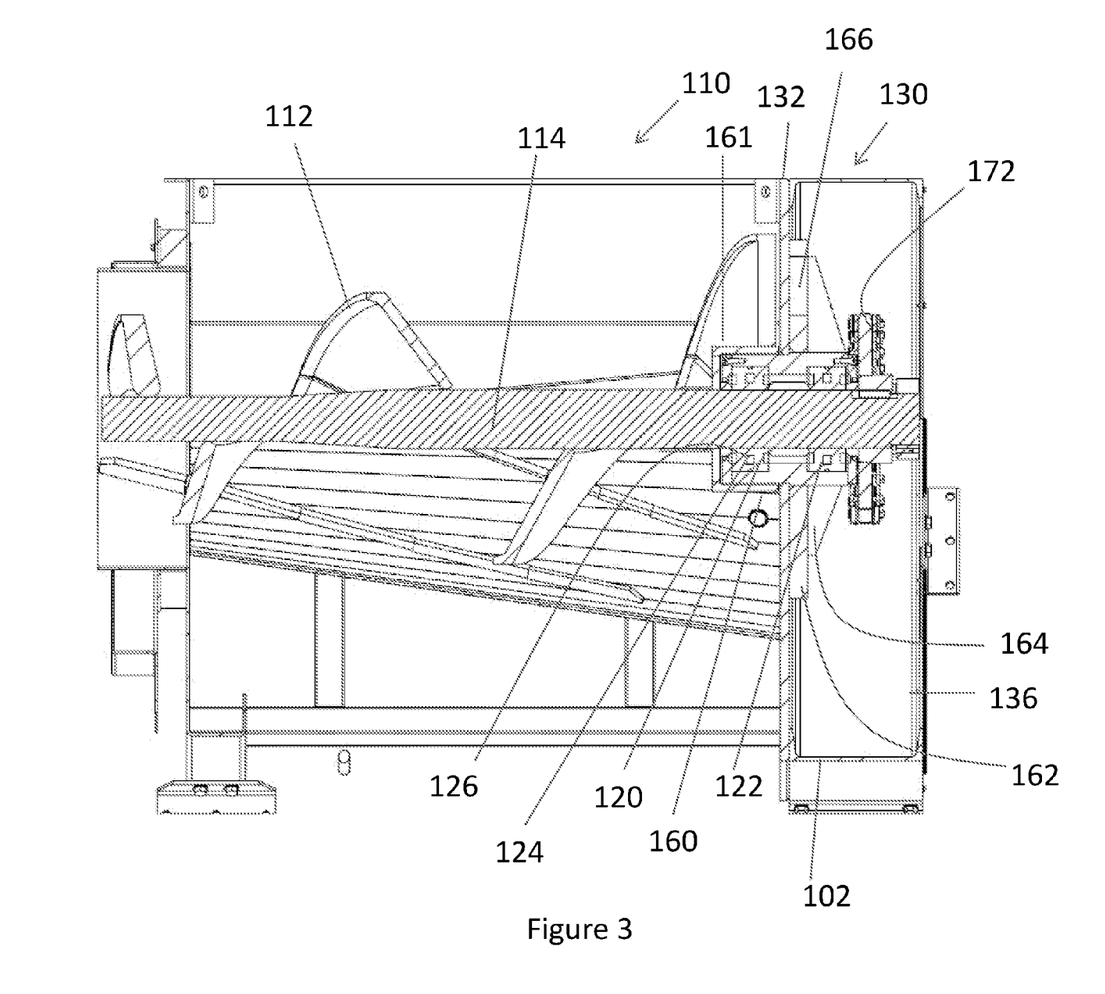
FIG. 3 is a cross-section view of the cantilevered screw assembly of FIG. 1.

The bearing housing 160 may extend beyond first wall 132 and between first wall 132 and anchoring wall 136 in this example. Bearing housing 160 may serve as further reinforcement in this manner. In this exemplary embodiment, first bearing 120 and second bearing 122 are respectively situated on opposite sides of first wall 132. With respect to the example in FIG. 1, the bearing housing may extend out further beyond first wall 132 (in a distal direction), such that first bearing 120 is not aligned with a respective wall but is located beyond the first wall 132 (i.e., on a distal side of first wall 132). The second bearing 122 may be located between the first wall 132 and the anchoring wall 136 in this example. In other words, the first wall 132 may be situated or aligned between the first bearing 120 and the second bearing 122. Such an embodiment may permit a larger screw 112. For example, the flight of screw 112 may be configured to extend over the bearing housing 160 such as shown in FIG. 1, thereby allowing for a larger screw 112 as well as preventing material from collecting around bearing housing 160 where it may not otherwise be accessible by the screw 112. In other exemplary embodiments, however, at least one bearing may be aligned with a wall. An example of such an embodiment may also increase the stability and strength characteristics of the screw.

An example of first bearing 120 and/or second bearing 122 may be a solid oil bearing. U.S. Pat. Nos. 9,132,968 and 9,212,005 describe examples of solid oil bearings and are hereby respectively incorporated by reference in their entirety. In this exemplary embodiment, an example of a solid oil bearing may have a cavity that is filled with solid oil. For example, solid oil bearing 120 has a cavity 124 that is filled with solid oil 126. Solid oil 126 may form adjacent or around the rolling elements of bearing 120, for example, to provide lubrication. Other bearing designs comprising solid oil are also possible, and/or other suitable types of bearings (e.g., grease-lubricated bearings) may be used.

Figure 4:
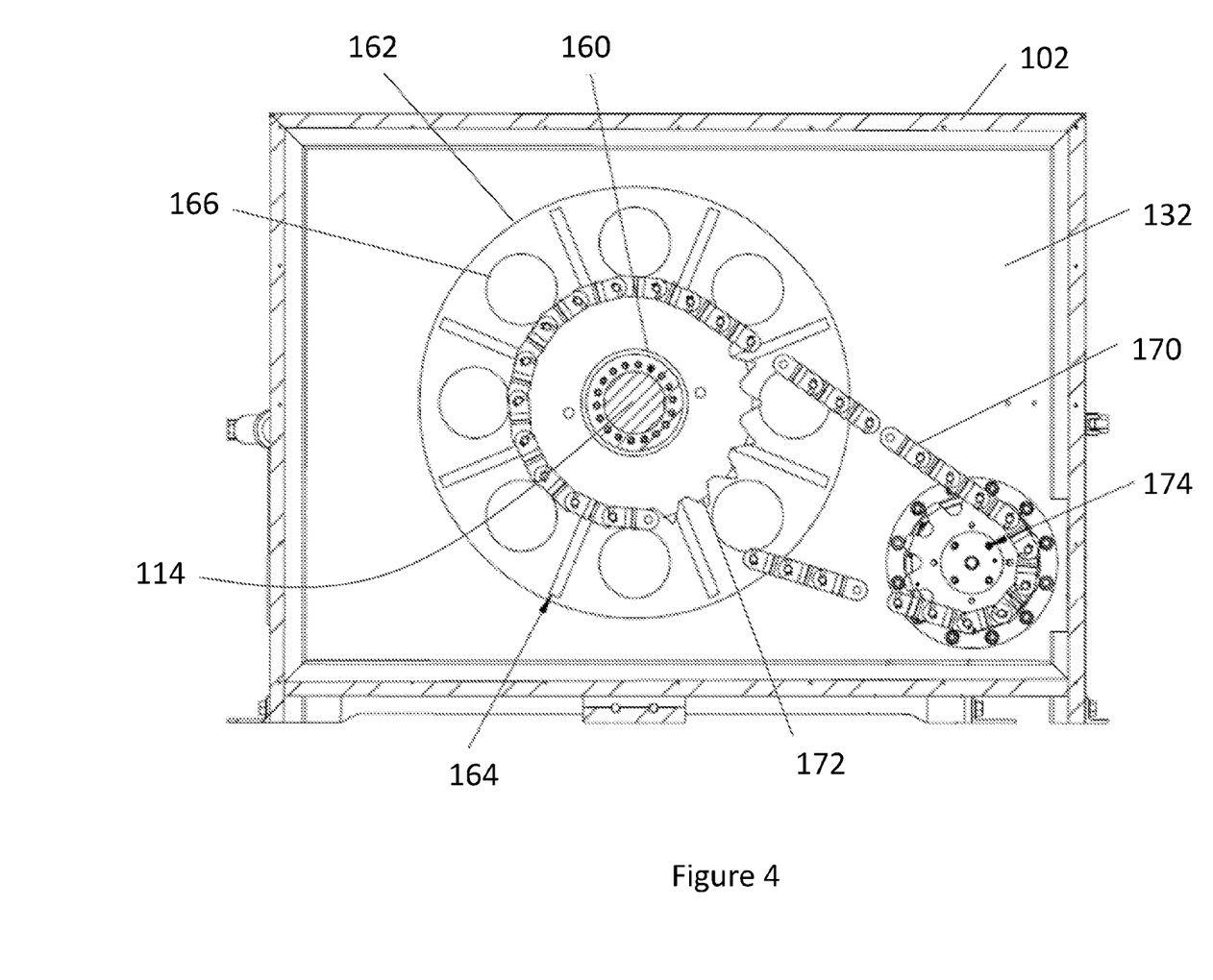
FIG. 4 is a rear cross-section view of the cantilevered screw assembly of FIG. 1, where portions have been removed for clarity.
Figure 5:
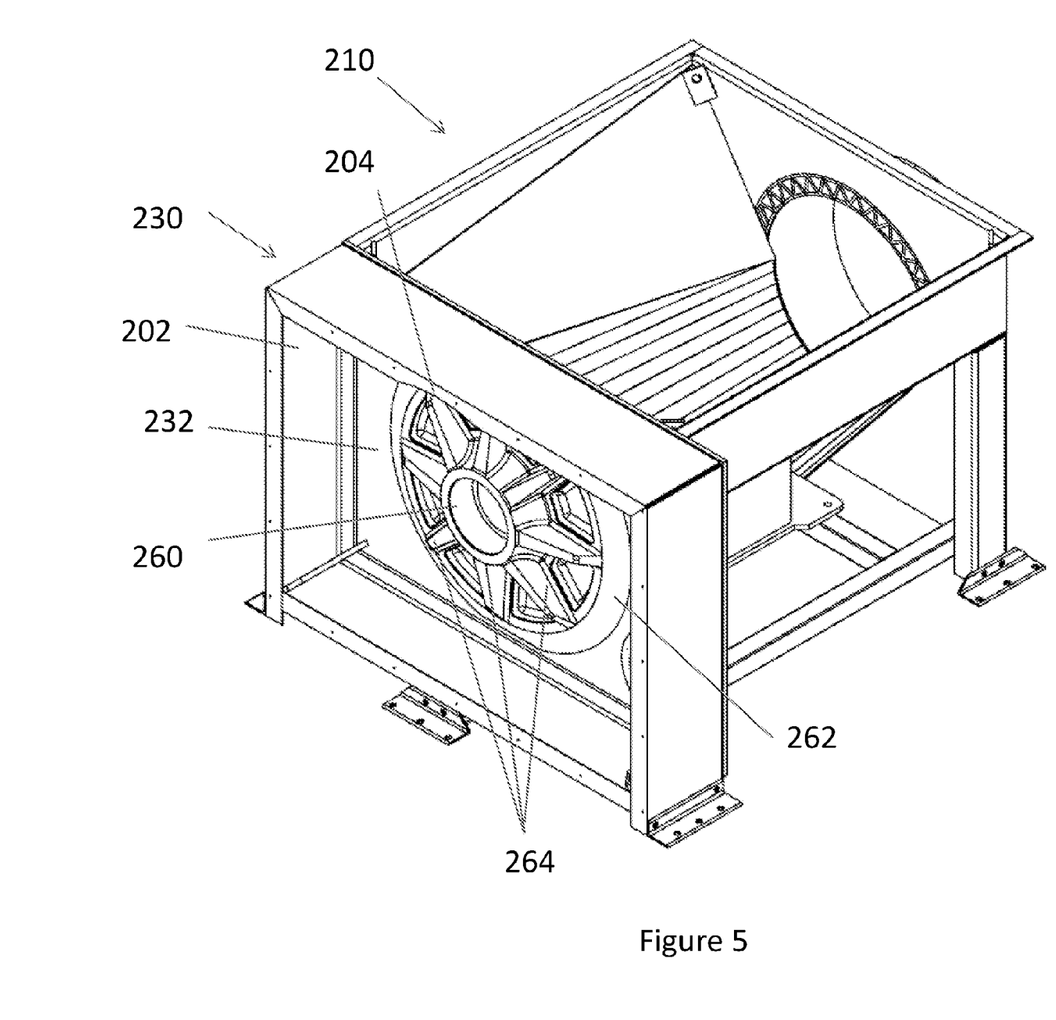
FIG. 5 is a perspective view of an exemplary embodiment of a cantilevered screw assembly, where portions have been removed for clarity.

Referring to FIG. 4, the anchoring wall 136 has been removed for clarity. The drive chain assembly 170 may be situated outside of first wall 132 (i.e., on the proximal side of first wall 132). More particularly, drive chain assembly 170 is situated between first wall 132 and anchoring wall 136 in this example. However, in some other exemplary embodiments, a drive chain assembly may be situated in another suitable position for facilitating rotation of the screw 112. Also, in other exemplary embodiments, other types of drive chain assemblies or other types of drive mechanisms may be used to facilitate rotation of the screw. Furthermore, as noted above, other exemplary embodiments may not include an anchor wall (i.e., the screw is cantilevered to a single support wall), or other exemplary embodiments may include additional walls in a multiple wall assembly (which may or may not be incorporated in the one-piece support wall assembly).

FIGS. 5-8 show various views of another exemplary embodiment of a cantilevered screw assembly 210 featuring a cast wall assembly, where the screw and other portions are not shown for clarity. Many aspects of this exemplary embodiment are similar to the previous embodiment. It should be appreciated that similar features may be structured similarly, operate similarly, and/or have the same function unless otherwise indicated by the drawings or this specification. For example without limitation, a bearing assembly may comprise a bearing housing 260, which is associated with a first wall 232 and comprises at least one flared edge 262 and at least one flange 264 and may be adapted to be reinforced such as by the use of a series of receptacles adapted to house a series of reinforcement members. Additionally, the assembly may be associated with at least one wall of a multiple wall assembly 230 in some exemplary embodiments. For example, a multiple wall assembly 230 may be comprised of the first wall 232, to which the screw is cantilevered and the bearings are mounted. Though not shown in the present figures, a multiple wall assembly may also include an anchor wall associated with the shaft. However, other exemplary embodiments may not include an anchor wall (i.e., the screw is cantilevered to a single support wall), or other exemplary embodiments may include additional walls in a multiple wall assembly (which may or may not be incorporated in the one-piece support wall assembly).

In the present exemplary embodiment, a first wall assembly 200 may be formed as a one-piece unit comprised of the first wall 232 and at least a portion of bearing housing 260, at least one flared edge 262, and/or at least one flange 264.

Figure 6:
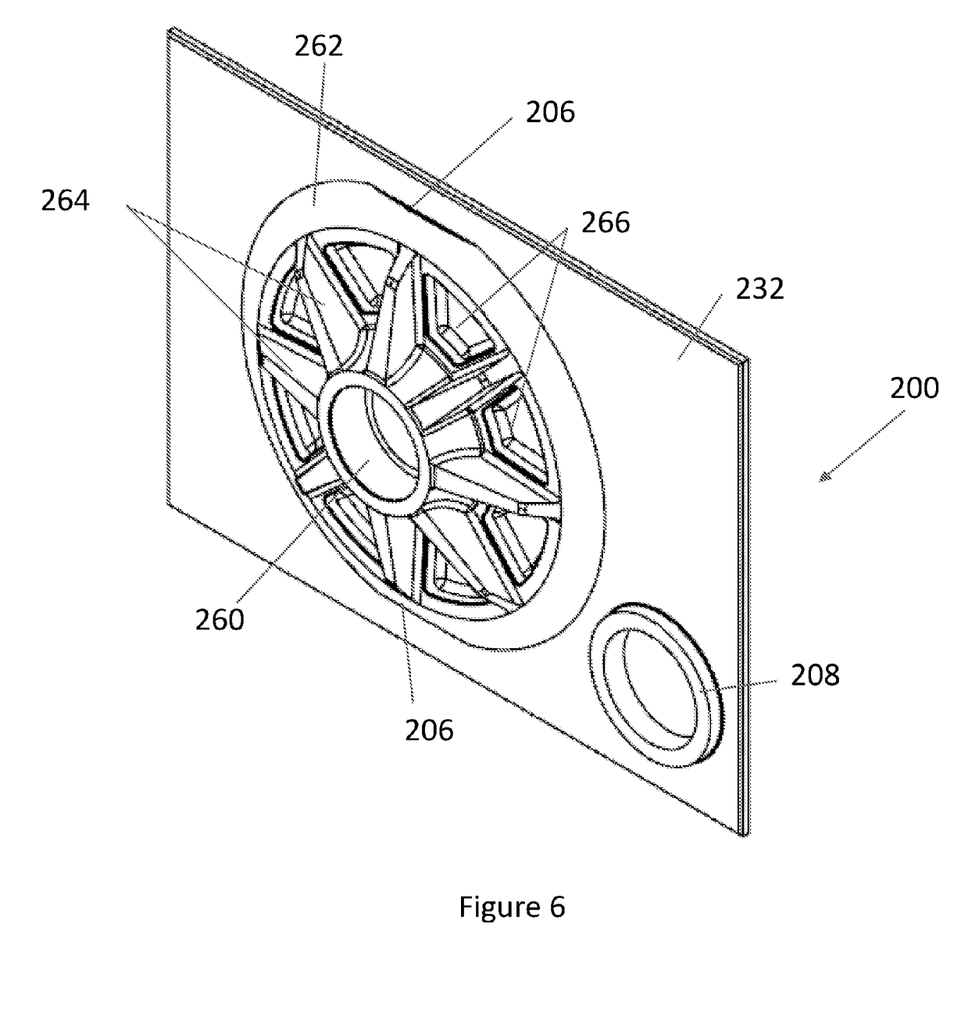
FIG. 6 is a front perspective view of the cast wall assembly of FIG. 5.
Figure 7:
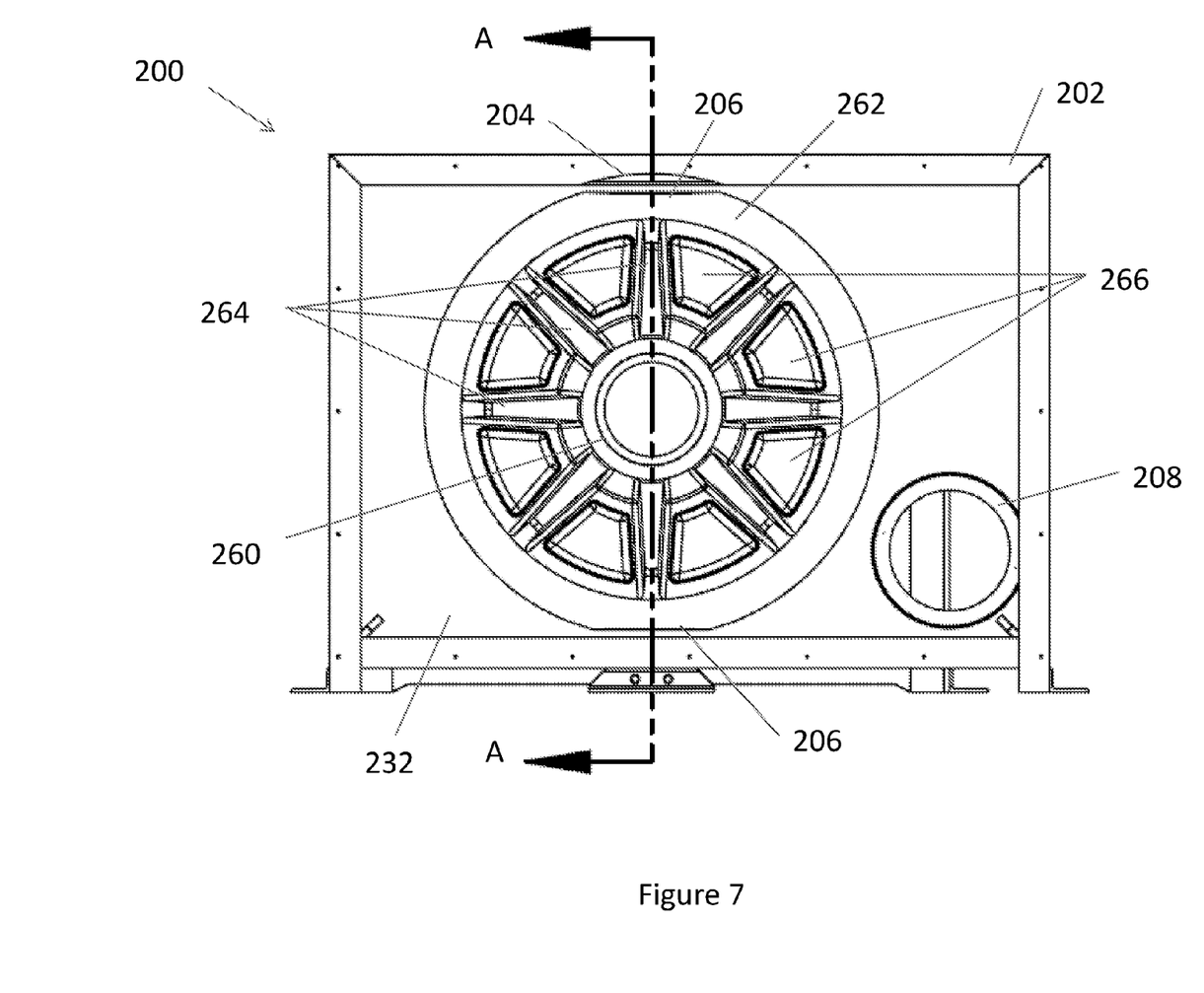
FIG. 7 is a rear elevation view of the assembly of FIG. 5, additionally indicating section line A-A.
Figure 8:
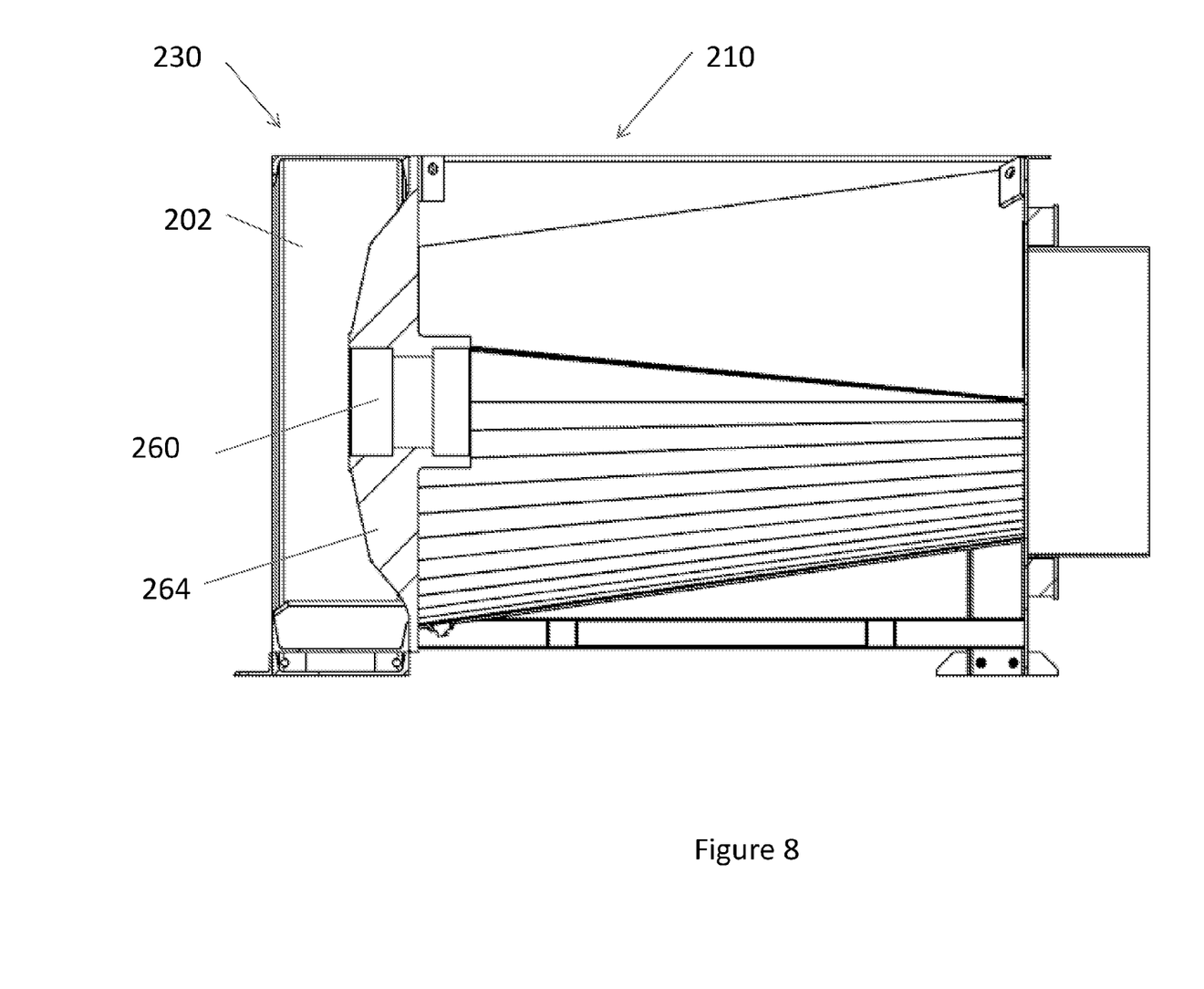
FIG. 8 is a view taken along section line A-A of FIG. 7.

Such as shown in FIG. 6, an exemplary embodiment of first wall assembly 200 may also include a second flared edge 208. The second flared edge 208 may be located, sized, and adapted to allow the motor for a drive chain assembly (e.g., 170 comprising at least one sprocket (e.g., 174) and related components) to pass through and be mounted thereto. In a preferred embodiment, the first wall assembly 200 may be comprised of a single casting.

Similar to the previous embodiment, a one-piece support wall assembly (e.g., a single casting) advantageously strengthens the assembly and facilitates improved distribution of the forces associated with cantilevering the screw assembly, which may permit the assembly in one exemplary embodiment to be cantilevered without the need for bulky reinforcement members or otherwise larger components to handle the associated forces. In addition, a one-piece support wall assembly (e.g., a cast wall assembly) may decrease assembly costs and increase manufacturing efficiency.

In an exemplary embodiment, this one-piece support wall assembly (e.g., a single casting) may reduce the weight of bearing housing 260 by removing otherwise required weld material, fasteners, or other assembly devices used in conventional assemblies. This may likewise increase the strength and rigidity per weight of first wall assembly 200, thereby increasing the stability of the screw. This may also reduce the manufacturing and assembly complexity required by reducing the number of parts required to be manufactured and assembled.

An exemplary embodiment of a one-piece support wall assembly (e.g., a cast wall assembly) may enable the flared edge 262 and the at least one flange 264 to extend further across first wall 232 as compared to conventional assemblies. Such an embodiment may allow for improved distribution of forces caused by the screw, which may promote increased stability and strength of first wall 232. More particularly, an embodiment comprised of a cast wall assembly, for example, may allow for the flared edge 262 and the at least one flange 264 to extend further across first wall 232 as compared to conventional embodiments of a similar weight that are not comprised of a cast wall assembly, thereby increasing strength and stability per weight.

The first wall 232 may be framed by a channel 202, which may also be included in the one-piece support wall assembly (e.g., a single casting) in some embodiments to further enhance strength and stability. In an exemplary embodiment, the channel 202 may extend from the first wall 232 to an anchoring wall. As needed, in view of channel 202, the upper and lower portions of the flared edge 262 may comprise flat surfaces 206 to permit the flared edge 262 to fit on the first wall 232. However, an example of the channel 202 may comprise at least one arched section 204 configured to accommodate a larger flared edge 262 without a corresponding flat surface 206.

An example of the first wall assembly 200 may comprise a series of receptacles 266, which may function similarly to the receptacles 166, though they may be of different size and location. In one example, the receptacles 266 may be sized and located to receive reinforcement members. As a result of casting or other one-piece support wall assembly, however, an exemplary embodiment may not require additional reinforcement members. In such other embodiments, the receptacles 266 may be more accurately described as apertures, which may likewise be located between each of the at least one flange 264. For example, the apertures 266 may be utilized without reinforcement members and may serve to reduce the amount of material and thus the weight of the first wall assembly 200, while still providing sufficient stability and strength for particular applications.

Due to the aforementioned benefits, the exemplary embodiments of a cantilevered screw assembly are particularly useful for processing waste materials or other intensive applications. However, exemplary embodiments of a cantilevered screw assembly may also serve other purposes not limited to the processing of waste materials.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A screw assembly comprising:
a screw housing comprising a first wall;
a screw situated in and cantilevered to said first wall; and
a bearing assembly secured to said first wall of said screw housing and adapted to facilitate rotation of said screw relative to said first wall, said bearing assembly comprising a bearing housing that extends through said first wall and houses at least one bearing;
wherein said first wall and at least a portion of said bearing housing are formed of a single casting; and
wherein a flight of said screw extends over said bearing housing.

2. The screw assembly of claim 1 wherein said screw comprises a shaft in association with said at least one bearing.

3. The screw assembly of claim 1 wherein said bearing housing comprises:
a body; and
at least one flared edge extending from said body;
wherein at least a portion of said body and said at least one flared edge are formed of said single casting with said first wall.

4. The screw assembly of claim 1 wherein said bearing housing comprises:
a body;
at least one flared edge extending from said body; and
at least one flange extending from said body and in association with said at least one flared edge;
wherein at least a portion of said body, said at least one flared edge, and said at least one flange are formed of said single casting with said first wall.

5. The screw assembly of claim 1 wherein said at least one bearing comprises a first bearing and a second bearing.

6. The screw assembly of claim 5 wherein said first wall is adjacent to and spaced apart from a second wall of said screw housing.

7. The screw assembly of claim 6 wherein said first bearing and said second bearing are respectively situated on opposite sides of said first wall such that said first bearing is situated on a distal side of said first wall and said second bearing is situated between said first wall and said second wall.

8. The screw assembly of claim 6 further comprising a drive chain assembly situated between said first wall and said second wall;
   wherein said drive chain assembly is adapted to facilitate rotation of said screw.

9. A screw assembly comprising:
   a multiple wall assembly comprising a first wall and a second wall that are adjacent to each other and spaced apart;
   a screw cantilevered to at least said first wall of said multiple wall assembly; and
   a bearing assembly secured to said first wall of said multiple wall assembly, said bearing assembly adapted to facilitate rotation of said screw relative to said first wall, said bearing assembly comprising a bearing housing that extends through said first wall and houses at least one bearing;
   wherein said first wall and at least a portion of said bearing housing are formed of a single casting; and
   wherein a flight of said screw extends over said bearing housing.

10. The screw assembly of claim 9 further comprising at least one reinforcement member connecting said bearing assembly to said second wall of said multiple wall assembly.

11. The screw assembly of claim 9 wherein said screw comprises a shaft associated with said multiple wall assembly.

12. The screw assembly of claim 9 wherein said bearing housing comprises:
   a body; and
   at least one flared edge extending from said body;
   wherein at least a portion of said body and said at least one flared edge are formed of said single casting with said first wall.

13. The screw assembly of claim 9 further comprising a drive chain assembly situated between said first wall and said second wall of said multiple wall assembly;
   wherein said drive chain assembly is adapted to facilitate rotation of said screw.

14. A screw assembly comprising:
   a multiple wall assembly comprising a first wall and a second wall that are adjacent to each other and spaced apart;
   a screw cantilevered to at least said first wall of said multiple wall assembly; and
   a bearing assembly secured to said multiple wall assembly and adapted to facilitate rotation of said screw relative to said multiple wall assembly, said bearing assembly comprising a bearing housing that extends through said first wall and houses a first bearing and a second bearing such that said first wall of said multiple wall assembly is aligned between said first bearing and said second bearing;
   wherein said first wall and at least a portion of said bearing housing are formed of a single casting; and
   wherein a flight of said screw extends over said bearing housing.

15. The screw assembly of claim 14 further comprising a plurality of reinforcement members connecting said first wall to said second wall such that said reinforcement members are positioned around a shaft of the screw.

16. The screw assembly of claim 14 wherein said bearing housing comprises:
   a body; and
   at least one flared edge extending from said body;
   wherein at least a portion of said body and said at least one flared edge are formed of said single casting with said first wall.

17. The screw assembly of claim 14 further comprising a drive chain assembly situated between said first wall and said second wall;
   wherein said drive chain assembly is adapted to facilitate rotation of said screw.

* * * * *